ically the proportionate weights stated, viz.

UNITED STATES PATENT OFFICE.

DAVID M. HOWE, OF BELLEVUE BOROUGH, PENNSYLVANIA.

PROTECTIVE COMPOUND FOR METAL SURFACES.

1,121,363. Specification of Letters Patent. Patented Dec. 15, 1914.

No Drawing. Application filed October 31, 1913. Serial No. 798,453.

*To all whom it may concern:*

Be it known that I, DAVID M. HOWE, a citizen of the United States, and residing in the borough of Bellevue, in the county of Allegheny and State of Pennsylvania, have invented or discovered new and useful Improvements in Protective Compounds for Metal Surfaces, of which the following is a specification.

My invention comprises a new and improved compound or paste to be applied to steel and metal structures, such as overhead bridges, train-sheds, coal-tipples, head-frames and other erections which are exposed to the fumes escaping from locomotive stacks and other sources. Structures so exposed become badly eaten by the fumes in a relatively-short time, being rendered dangerous and causing great expense of upkeep. Ordinary paints and coatings in general use do not themselves resist the fumes and quickly crack and peel, thus exposing the metal to the fumes.

My invention is in the form of a paste compounded of the following ingredients combined in substantially the proportionate weights stated, viz.

| | |
|---|---|
| Cement | 45% |
| Graphite and silica | 40% |
| Red lead | 8% |
| Litharge | 2% |
| Linseed oil and turpentine | 5% |

The cement used is preferably the best quality German Portland cement. The graphite used is combined with silica as it is produced from the mines. The linseed oil and turpentine mixture is preferably two parts of linseed oil to one of turpentine. The proportion of silica and graphite which I prefer to use is about 25% of silica to 75% of graphite, although the percentage of silica may fall as low as 5% or rise to almost 50% without seriously impairing the effect. The cement and graphite and silica are first thoroughly intermingled and the remaining ingredients added thereto, forming a paste.

The metal surface to be protected is first given a coat of first class graphite, carbon or other paint which is allowed to dry. My paste is then applied with a trowel or other tool in a layer about $\frac{3}{16}$ of an inch thick. The paste gradually sets and hardens, adhering perfectly to the painted metal and cohering together in an elastic, uncrackable and unflakable, but hard protective layer upon which the fumes have not the slightest effect and through which they can not pass to attack the metal.

The cement furnishes the body of the paste, gives it the hardening and setting qualities and fills the pores of the metal surface. The graphite renders the coating flexible and resilient and prevents cracking and scaling while the silica hardens the graphite. The red lead improves the pasty nature of the compound, facilitates its application and prevents too rapid hardening after application. The litharge acts as a drier while the linseed oil and turpentine act as the vehicle. Great adhesive and cohesive qualities are thus obtained. The hard surface to which the paste is applied drives the oils toward the outer surface of the coating thus preventing the same from becoming too hard and rigid. Any other suitable oil may be substituted as a vehicle for the linseed oil and turpentine but I prefer the latter.

What I desire to claim is:—

1. The herein described protective compound in the form of paste for metal surfaces consisting of cement, graphite and silica, red lead, litharge and a vehicle such as linseed oil and turpentine.

2. The herein described protective compound for metal surfaces consisting of the following ingredients in substantially the following proportions by weight, cement forty-five per cent.; graphite and silica, forty per cent.; red lead eight per cent.; litharge two per cent., and a vehicle, such as linseed oil and turpentine, five per cent.; in the form of paste.

Signed at Pittsburgh, Penna., this 30th day of October, 1913.

DAVID M. HOWE.

Witnesses:
E. A. LAWRENCE,
GEO. K. FERRALL.